United States Patent
Fan et al.

(10) Patent No.: US 10,945,227 B2
(45) Date of Patent: Mar. 9, 2021

(54) METHOD AND DEVICE FOR SIGNAL MEASUREMENT

(71) Applicant: Telefonaktiebolaget LM Ericsson (publ), Stockholm (SE)

(72) Inventors: Rui Fan, Beijing (CN); Shaohua Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/604,392

(22) PCT Filed: Apr. 18, 2018

(86) PCT No.: PCT/CN2018/083534
§ 371 (c)(1),
(2) Date: Oct. 10, 2019

(87) PCT Pub. No.: WO2018/201893
PCT Pub. Date: Nov. 8, 2018

(65) Prior Publication Data
US 2020/0163036 A1 May 21, 2020

(30) Foreign Application Priority Data
May 4, 2017 (WO) ................ PCT/CN2017/083102

(51) Int. Cl.
*H04W 24/00* (2009.01)
*H04W 56/00* (2009.01)
(Continued)

(52) U.S. Cl.
CPC ... *H04W 56/0015* (2013.01); *H04W 36/0088* (2013.01); *H04W 56/005* (2013.01); *H04W 72/0453* (2013.01)

(58) Field of Classification Search
None
See application file for complete search history.

(56) References Cited

U.S. PATENT DOCUMENTS

2012/0178465 A1 7/2012 Lin et al.
2013/0308481 A1 11/2013 Kazmi et al.
(Continued)

FOREIGN PATENT DOCUMENTS

WO 2016146177 A1 9/2016

OTHER PUBLICATIONS

International Search Report and Written Opinion for International Patent Application No. PCT/CN2018/083534, dated Jul. 12, 2018, 9 pages.

(Continued)

*Primary Examiner* — Erika A Washington
(74) *Attorney, Agent, or Firm* — Withrow & Terranova, PLLC

(57) ABSTRACT

Embodiments of the disclosure generally relate to configuring a measurement gap. A network device obtains information about a first frequency region and a second frequency region. The first frequency region is being used for transmitting a first synchronization signal from a serving cell managed by the network device, and the second frequency region is used for transmitting a second synchronization signal from a neighbor cell of the serving cell. Then, the network device determines a configuration for a measurement gap based on the first and second frequency regions, and transmits the configuration for the measurement gap to the terminal device.

14 Claims, 6 Drawing Sheets

(51) Int. Cl.
*H04W 36/00* (2009.01)
*H04W 72/04* (2009.01)

(56) References Cited

U.S. PATENT DOCUMENTS

| | | |
|---|---|---|
| 2016/0057708 A1 | 2/2016 | Siomina et al. |
| 2016/0302098 A1 | 10/2016 | Gheorghiu et al. |
| 2017/0034757 A1 | 2/2017 | Yang et al. |
| 2018/0139715 A1* | 5/2018 | Ly .................... H04W 56/0025 |

OTHER PUBLICATIONS

Ericsson, "R2-1711340: Configuration of measurement gap in NR," 3GPP TSG-RAN WG2, #99bis, Oct. 9-13, 2017, Prague, Czech Republic, 4 pages.
Huawei, "R1-1611684: Email discussion [86b-20] on synchronization and carrier rasters for NR," 3GPP TSG RAN NG1, Meeting #87, Nov. 14-18, 2016, Reno, Nevada, 11 pages.
Huawei, et al., "R4-1701426: Discussion on the RRM impact on flexible bandwidth," 3GPP TSG-RAN WG4, Meeting #82, Feb. 13-17, 2017, Athens, Greece, 3 pages.
Partial Supplementary European Search Report for European Patent Application No. 18794094.5, dated Nov. 9, 2020, 17 pages.

* cited by examiner

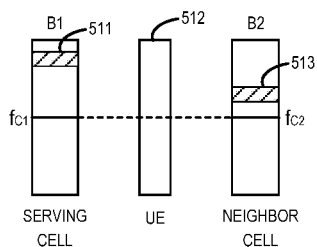
FIG. 5A
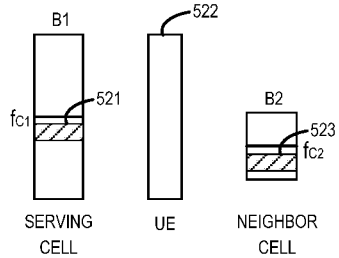
FIG. 5B
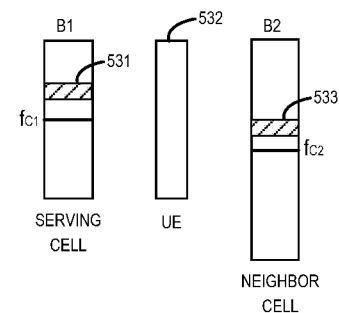
FIG. 5C
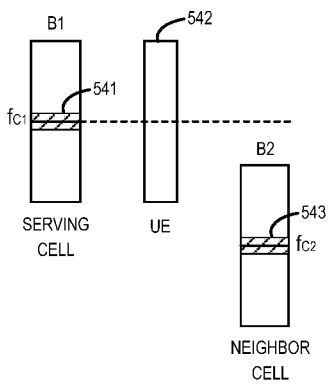
FIG. 5D
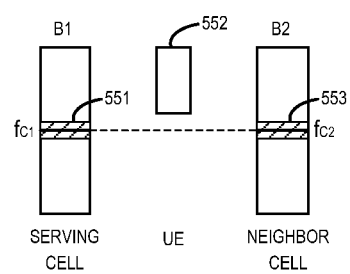
FIG. 5E
600
RECEIVE A CONFIGURATION FOR A MEASUREMENT GAP FROM A NETWORK DEVICE MANAGING A SERVING CELL — 610
MEASURE THE SECOND SYNCHRONIZATION SIGNAL BASED ON THE CONFIGURATION FOR THE MEASUREMENT GAP — 620
FIG. 6

METHOD AND DEVICE FOR SIGNAL MEASUREMENT

This application is a 35 U.S.C. § 371 national phase filing of International Application No. PCT/CN2018/083534, filed Apr. 18, 2018, which claims the benefit of International Application No. PCT/CN2017/083102, filed May 4, 2017, the disclosures of which are incorporated herein by reference in their entireties.

TECHNICAL FIELD

Embodiments of the present disclosure generally relate to the field of communications, and more particularly, to a method and device for signal measurement.

BACKGROUND

In Long Term Evolution (LTE), a terminal device, for example, user equipment (UE) may perform non-gap assisted or gap assisted measurement on synchronization signals according to, for example, capability and operating frequency of a UE. In non-gap assisted scenarios, the UE can carry out measurement on synchronization signals from its serving cell and neighbor cell without a measurement gap. In gap assisted scenarios, the UE just carries out measurement on the synchronization signals from the neighbor cell in the measurement gap.

Conventionally, it is assumed that a center of a frequency region for transmitting a synchronization signal is the same as a center (also referred to as "carrier frequency" hereafter) of a carrier of a cell. In such cases, the network device configures the measurement gap based on carrier frequencies of the serving cell and the neighbor cell. If the carrier frequencies of the serving cell and the neighbor cell are the same, the network device would understand that the synchronization signals are transmitted on the same frequency region from both the serving cell and the neighbor cell, and would not configure a measurement gap. Thus, the UE measures the synchronization signals without the measurement gap. On the other hand, if the carrier frequencies of the serving cell and the neighbor cell are different, the network device would configure a time duration, that is, a measurement gap, for the UE to only measure the synchronization signal from the neighbor cell. In the measurement gap, the UE does not measure the synchronization signal from the serving cell.

In some newly developed networks, for example, the New Radio (NR), the center of the frequency region for transmitting the synchronization signal may be different from the carrier frequency. According to the conventional solution, even if the centers of the frequency regions for transmitting synchronization signals from the serving cell and the neighbor cell are different, the network device would not configure the measurement gap in the case that the carrier frequencies of the serving cell and the neighbor cell are the same. As a result, the network device configures the measurement gap in an incorrect way, and the UE cannot measure the synchronization signal accurately. As such, spectrum efficiency is decreased and performance of the network is reduced.

SUMMARY

In general, embodiments of the present disclosure provide a solution for solving the measurement gap configuration issue as discussed above.

In a first aspect, a method implemented at a network device is provided. The network device obtains information about a first frequency region and a second frequency region. The first frequency region is used for transmitting a first synchronization signal from a serving cell managed by the network device, and the second frequency region is used for transmitting a second synchronization signal from a neighbor cell of the serving cell. Then, the network device determines a configuration for a measurement gap based on the first frequency region and the second frequency region. The configuration indicates whether the measurement gap is configured for a terminal device in the serving cell to measure the second synchronization signal. Afterwards, the network device transmits the configuration for the measurement gap to the terminal device.

In one embodiment, determining the configuration for a measurement gap comprises: determining a relationship between the first frequency region and the second frequency region; and determining whether the measurement gap needs to be configured based on at least one of the relationship and information of capability of the terminal device.

In one embodiment, determining whether the measurement gap needs to be configured comprises: in response to the second frequency region being different from the first frequency region, determining that the measurement gap needs to be configured; and in response to the second frequency region being identical to the first frequency region, determining whether the first or second frequency region is in an operating frequency range of the terminal device, and in response to determining that the first or second frequency region is in the operating frequency range of the terminal device, determining that the measurement gap does not need to be configured.

In one embodiment, determining whether the measurement gap needs to be configured comprises: in response to the first or second frequency region being out of an operating frequency range of the terminal device, determining that the measurement gap needs to be configured; and in response to the first and second frequency regions being in the operating frequency range of the terminal device, determining that the measurement gap does not need to be configured.

In one embodiment, determining whether the measurement gap needs to be configured comprises: in response to the first or second frequency region being out of an operating frequency range of the terminal device, determining that the measurement gap needs to be configured; and in response to the first and second frequency regions being in the operating frequency range of the terminal device, determining whether the neighbor cell is synchronized with the serving cell, in response to determining that the neighbor cell is synchronized with the serving cell, determining that the measurement gap does not need to be configured, in response to determining that the neighbor cell being asynchronous with the serving cell, determining whether the first frequency region is different from the second frequency region, and in response to the first frequency region is different from the second frequency region, determining that the measurement gap needs to be configured.

In one embodiment, determining whether the measurement gap needs to be configured comprises: in response to the second frequency region being different from the first frequency region, transmitting, to a neighbor network device managing the neighbor cell, a request for aligning the second frequency region to the first frequency region, and in response to receiving, from the neighbor network device, a response indicating that the second frequency region is aligned to the first frequency region, determining that the measurement gap does not need to be configured.

In one embodiment, the network device may further transmit, to the terminal device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

In a second aspect, an apparatus implemented at a network device is provided. The apparatus includes an obtaining unit, a determining unit and a transmitting unit. The obtaining unit is configured to obtain information about a first frequency region and a second frequency region. The first frequency region is used for transmitting a first synchronization signal from a serving cell managed by the network device, and the second frequency region is used for transmitting a second synchronization signal from a neighbor cell of the serving cell. The determining unit is configured to determine a configuration for a measurement gap based on the first frequency region and the second frequency region. The configuration indicates whether the measurement gap is configured for a terminal device in the serving cell to measure the second synchronization signal. The transmitting unit is configured to transmit the configuration for the measurement gap to the terminal device.

In a third aspect, a network device is provided. The network device includes: a processor and a memory. The memory contains instructions executable by the processor, whereby the processor being adapted to cause the network device to perform the method according to the first aspect of the present disclosure.

In a fourth aspect, a method implemented at a terminal device is provided. The terminal device receives a configuration for a measurement gap from a network device managing a serving cell. The configuration for the measurement gap is determined based on a first frequency region and a second frequency region and indicates whether the measurement gap is configured for the terminal device to measure the second synchronization signal. The first frequency region is used for transmitting a first synchronization signal from the serving cell, and the second frequency region is used for transmitting a second synchronization signal from a neighbor cell of the serving cell. Then, the terminal device measures the second synchronization signal based on the configuration for the measurement gap.

In an embodiment, measuring the second synchronization signal comprises: in response to the configuration indicating that the measurement gap is configured, measuring the second synchronization signal on the second frequency region in the measurement gap; and in response to the configuration indicating that the measurement gap is not configured, measuring the second synchronization signal on the second frequency region together with measuring first synchronization signal on the first frequency region.

In an embodiment, the terminal device may receive, from the network device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

In an embodiment, measuring the second synchronization signal comprises: in response to the configuration indicating that the measurement gap is configured, determining whether the measurement gap is to be used when measuring the second synchronization signal based on the information about whether the neighbor cell is synchronized with the serving cell.

In an embodiment, the terminal device may transmit information of capability of the terminal device to the network device.

In a fifth aspect, an apparatus implemented at a terminal device is provided. The apparatus includes a receiving unit and a measuring unit. The receiving unit is configured to receive a configuration for a measurement gap from a network device managing a serving cell, the configuration for the measurement gap being determined based on a first frequency region and a second frequency region and indicating whether the measurement gap is configured for the terminal device to measure the second synchronization signal, the first frequency region being used for transmitting a first synchronization signal from the serving cell, and the second frequency region being used for transmitting a second synchronization signal from a neighbor cell of the serving cell. The measuring unit is configured to measure the second synchronization signal based on the configuration for the measurement gap.

In a sixth aspect, a terminal device is provided. The terminal device includes: a processor and a memory. The memory contains instructions executable by the processor, whereby the processor being adapted to cause the terminal device to perform the method according to the fourth aspect of the present disclosure.

In a seventh aspect, a method implemented at a network device is provided. The network device receives, from a serving network device managing a serving cell, a request for aligning a second frequency region to a first frequency region. The first frequency region is used for transmitting a first synchronization signal from the serving cell, and the second frequency region is used for transmitting a second synchronization signal from a neighbor cell of the serving cell. The neighbor cell is managed by the network device. Then, the network device generates a response indicating whether the second synchronization signal is aligned to the first synchronization signal, and transmits the response to the serving network device.

In an eighth aspect, an apparatus implemented at a network device is provided. The apparatus includes receiving unit, a generating unit, and a transmitting unit. The receiving unit is configured to receive, from a serving network device managing a serving cell, a request for aligning a second frequency region to a first frequency region, the first frequency region being used for transmitting a first synchronization signal from the serving cell, the second frequency region being used for transmitting a second synchronization signal from a neighbor cell of the serving cell, and the neighbor cell being managed by the network device. The generating unit is configured to generate a response indicating whether the second synchronization signal is aligned to the first synchronization signal. The transmitting unit is configured to transmit the response to the serving network device.

In a ninth aspect, a network device is provided. The network device includes: a processor and a memory. The memory contains instructions executable by the processor, whereby the processor being adapted to cause the network device to perform the method according to the seventh aspect of the present disclosure.

According to embodiments of the present disclosure, a network device configures the measurement gap based on frequency regions for transmitting synchronization signals from different cells, instead of the carrier frequencies of the cells. In this way, the network device can correctly configure the measurement gap, and the UE can measure the synchronization signal more accurately. As such, spectrum efficiency can be increased and performance of the network can be improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIGS. 5A-5E show diagrams of operating frequency ranges of a UE, a serving cell and a neighbor cell and frequency regions for transmitting synchronization signals in accordance with further embodiments of the present disclosure, respectively;

FIG. 6 shows a flowchart of a method 600 of measuring a synchronization signal according to configuration of a measurement gap in accordance with an embodiment of the present disclosure;

DETAILED DESCRIPTION

Figure 1:
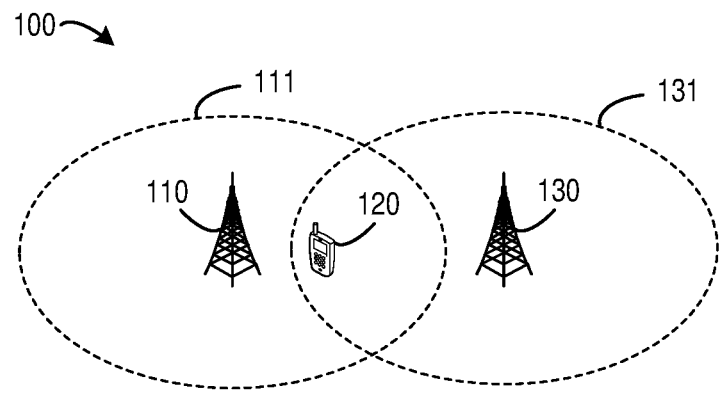
FIG. 1 shows a schematic diagram 100 of a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "device" refers to a network device or a terminal device in a wireless communication network.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which shows a schematic diagram 100 of a wireless communication network. In the wireless communication network, a network device 110 manages a serving cell 111 and is also referred to as a "serving network device." A terminal device 120 is served by the serving cell 111 and can measure synchronization signal from a neighbor cell 131 of the serving cell 111. In the example of FIG. 1, the neighbor cell 131 is managed by a network device 130 (also referred to as a "neighbor network device"). It is to be understood that this is only described for example, rather than limitation. Those skilled in the art would appreciate that the neighbor cell may be a cell that is managed by the serving network device other than the serving cell.

It is also to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Conventionally, the network device assumes that the center of a frequency region for transmitting a synchronization signal is the carrier frequency of a cell, and thus configures a measurement gap based on carrier frequencies of the serving cell and the neighbor cell. FIGS. 2A-2G show diagrams of operating frequency ranges of a UE, a serving cell and a neighbor cell according to conventional solutions, respectively.

Figure 2A:
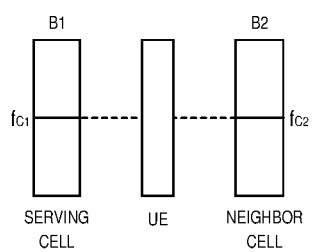
FIGS. 2A-2G show diagrams of operating frequency ranges of a UE, a serving cell and a neighbor cell according to conventional solutions, respectively.

FIG. 2A shows a scenario where the serving cell and the neighbor cell have the same carrier frequencies (fc1 and fc2), that is fc1=fc2, and have the same operating frequency ranges (also referred to as "cell bandwidths" or "bandwidths of cells" and denoted as B1 and B2 hereafter), that is B1=B2. This is an intra-frequency scenario with non-gap assisted measurement. Thus, the measurement gap does not need to be configured.

Figure 2B:
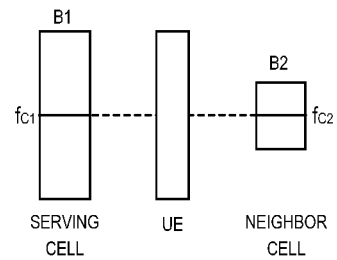

FIG. 2B shows a scenario where fc1=fc2 but B1>B2. This is an intra-frequency scenario with non-gap assisted measurement. Thus, the measurement gap does not need to be configured.

Figure 2C:
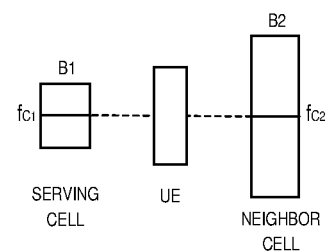

FIG. 2C shows a scenario where fc1=fc2 but B1<B2. This is an intra-frequency scenario with non-gap assisted measurement. Thus, the measurement gap does not need to be configured.

Figure 2D:
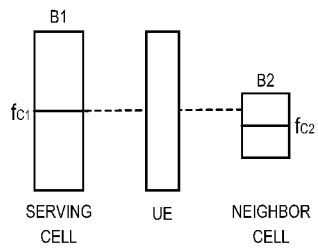

FIG. 2D shows a scenario where the serving cell and the neighbor cell have different carrier frequencies, fc1≠fc2, and the cell bandwidth of the serving cell is larger than that of the neighbor cell, B1>B2. This is an inter-frequency scenario and a measurement gap assisted scenario. Thus, the measurement gap needs to be configured.

Figure 2E:
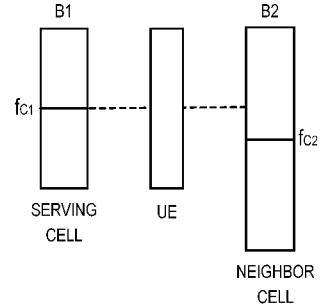

FIG. 2E shows a scenario where fc1≠fc2 and B1<B2. This is an inter-frequency scenario and a measurement gap assisted scenario. Thus, the measurement gap needs to be configured.

Figure 2F:
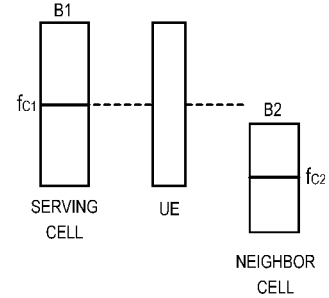

FIG. 2F shows a scenario where fc1≠fc2 and the cell bandwidth of the serving cell is not overlapped with that of the neighbor cell. This is an inter-frequency scenario and a measurement gap assisted scenario. Thus, the measurement gap needs to be configured.

Figure 2G:
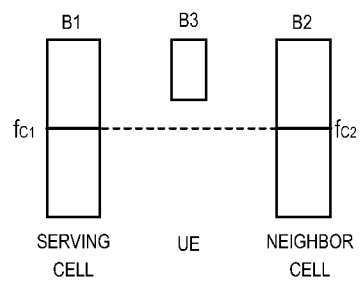

FIG. 2G shows a scenario where the carrier frequency fc1=fc2 but it goes beyond the operating frequency range (denoted as "B3") of the UE. This is an intra-frequency scenario and a measurement gap assisted scenario. Thus, the measurement gap needs to be configured.

For the intra-frequency cases where the neighbor cell has the same carrier frequency as the serving cell in FIGS. 2A, 2B and 2C, the measurement gap is not needed. For the inter-frequency or inter-RAT cases where the target cell has different carrier frequency as current cell in FIGS. 2D, 2E and 2F, the measurement gap is needed. For the intra-frequency case in FIG. 2G, the measurement gap is also needed. However, in NR, the synchronization signal, such as a Primary Synchronization Signal (PSS), a Secondary Synchronization Signal (SSS), a Physical Broadcast Channel (PBCH) signal, and so on, may be not transmitted on the carrier frequency. It is thus possible that the PSS/SSS/PBCH transmission of the neighbor cell may be different from the PSS/SSS/PBCH transmission of the serving cell even when the neighbor cell has the same carrier frequency as the serving cell. As such, even for the non-gap assisted scenario, the measurement gap may be needed due to deviation of the center of the frequency region of the synchronization signal from the subcarrier frequency.

In order to solve the above and other potential problems, embodiments of the present disclosure provide solutions for configuring the measurement gap. In the proposed solution, a network node may determine the configuration for a measurement gap based frequency regions for transmitting synchronization signals from a serving cell and a neighbor cell, respectively, and then transmit the configuration for the measurement gap to a terminal device in the serving cell. In this way, the measurement gap can be correctly configured and the terminal device can measure the synchronization signal in a more accurate way. As a result, spectrum efficiency can be increased and performance of the network can be improved.

Figure 3:
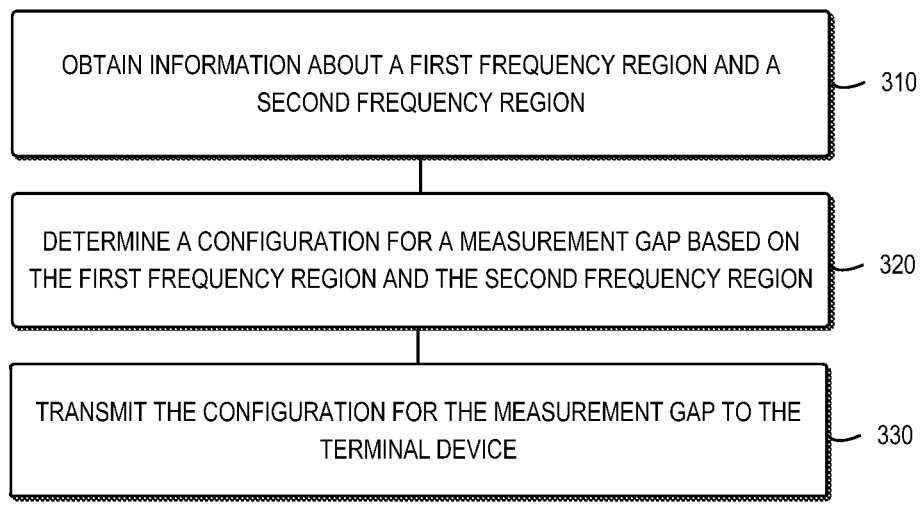
FIG. 3 shows a flowchart of a method 300 of configuring a measurement gap in accordance with an embodiment of the present disclosure.

More details of embodiments of the present disclosure will be discussed with reference to FIGS. 3 to 12 below. FIG. 3 shows a flowchart of a method 300 of configuring a measurement gap in accordance with an embodiment of the present disclosure. With the method 300, the above and other potential deficiencies in the conventional approaches can be overcome. It would be appreciated by those skilled in the art that the method 300 may be implemented by a network device, such as a serving network device 110 or other suitable devices.

The method 300 is entered at block 310, where the network device 110 obtains information about a first frequency region and a second frequency region. According to embodiments of the present disclosure, a "frequency region" refers to a frequency range for carrying signal(s). The first frequency region is used for transmitting a synchronization signal (also referred to as the "first synchronization signal") from a serving cell 111 managed by the network device 110, and the second frequency region is used for transmitting a synchronization signal (also referred to as the "second synchronization signal") from the neighbor cell 131.

The synchronization signal may include, for example, but not limited to, a PSS, a SSS, a PBCH signal, a reference signal (RS) for idle measurement, Channel State Information-Reference Signal (CSI-RS), and other suitable signal relevant to network synchronization.

The information about the first and/or second frequency regions may be obtained from Operation Administration and Maintenance (OAM) information of the wireless communication network 100 that maintains preconfigured frequency region(s) for synchronization signals. Alternatively or in addition, the information about the first and/or second frequency regions may be communicated, for example, via a high level signaling (such as a Radio Resource Control (RRC) signaling, a Media Access Control (MAC) signaling, etc.) between the serving network device 110 and the neighbor network device 130. It is to be understood that these examples for obtaining the information about the first and/or second frequency regions are discussed for illustration rather than limitation. Those skilled in the art would appreciate that there can be many other suitable ways to obtain the information within the scope of the present disclosure.

At block 320, the network device 110 determines a configuration for a measurement gap based on the first frequency region and the second frequency region. The configuration indicates whether the measurement gap is configured for the terminal device to measure the second synchronization signal. Thus, the configuration for the measurement gap may or may not include the measurement gap depending on different scenarios.

According to embodiments of the present disclosure, the configuration for a measurement gap may be determined in a variety of ways. For instance, the network device 110 may determine a relationship between the first frequency region and the second frequency region. Then, the network device 110 may determine whether the measurement gap needs to be configured based on at least one of the relationship and information of capability of the terminal device.

The relationship between the first frequency region and the second frequency region may indicate, for example, whether the second frequency region is identical to (the same as) or different from the first frequency region, relative positions of the first and/or second frequency regions to an operating frequency range of the terminal device, and the like. Thus, the network device may determine whether the first and/or second frequency regions are in or out of the operating frequency range of the terminal device.

The information of capability of the terminal device (also referred to as "UE capability" hereafter) may be obtained by the network device in several ways. For example, the network device may receive the information of the capability from the terminal device in advance or on demand. The information of the capability may indicate whether the terminal device needs a measurement gap. In addition, the information of the capability may further indicate the operating frequency range of the terminal device, a condition of a battery of the terminal device, power consumption, connection status, workload, and/or the like.

In some embodiments, the information of capability of the terminal device may include one or more indications to indicate whether the measurement gap is needed or not under given conditions. The conditions may include one or more of whether the second frequency region is different from the first frequency region, whether the first frequency region and the first or second frequency region is out of the operating frequency range of the terminal device, whether the neighbor cell is synchronized with the serving cell, and so on.

As one example, the information of capability of the terminal device may include the indication to indicate whether the measurement gap is needed or not if the second frequency region is different from the first frequency region.

As another example, the information of capability of the terminal device may include the indication to indicate whether the measurement gap is needed or not if the second frequency region is different from the first frequency region and the first or second frequency region is in the operating frequency range of the terminal device.

As a further example, the information of capability of the terminal device may include the indication to indicate whether the measurement gap is needed or not if the second frequency region is different from the first frequency region and the first or second frequency region is out of the operating frequency range of the terminal device.

As a still further example, the information of capability of the terminal device may include the indication to indicate whether the measurement gap is needed or not if the second frequency region is different from the first frequency region, the first or second frequency region is in the operating frequency range of the terminal device and the neighbor cell is synchronized with the serving cell.

As a still further example, the information of capability of the terminal device may include the indication to indicate whether the measurement gap is needed or not if the second frequency region is different from the first frequency region, the first or second frequency region is in the operating frequency range of the terminal device and the neighbor cell is not synchronized with the serving cell.

As a still further example, the information of capability of the terminal device may include the indication to indicate whether the measurement gap is needed or not if the first or second frequency region is out of an operating frequency range of the terminal device.

According to embodiments of the present disclosure, the network device may determine whether the measurement gap needs to be configured based on the relationship between the first and second frequency regions and/or the information of capability of the terminal device in a variety of ways. In some embodiments, in response to the second frequency region being different from the first frequency region, for example, but not limited to, different bandwidths, different or overlapped frequency locations, and so on, the network device 110 may determine that the measurement gap needs to be configured. If the second frequency region is identical to the first frequency region, the network device 110 may further determine whether the first or second frequency region is in an operating frequency range of the terminal device 120. If so, the network device 110 may determine that the measurement gap does not need to be configured. Otherwise, the network device 110 may determine that the measurement gap needs to be configured.

Alternatively, in some embodiments, if the first or second frequency region is out of an operating frequency range of the terminal device 120, for example, non-overlapped with or overlapped in part with the operating frequency range, the network device 110 may determine that the measurement gap needs to be configured. If the first and second frequency regions are in the operating frequency range of the terminal device 120, for example, both the first and second frequency regions are smaller or equal to the operating frequency range and located within the operating frequency range, the network device 110 may determine that the measurement gap does not need to be configured.

As a further alternative, in some embodiments, in response to the first or second frequency region being out of an operating frequency range of the terminal device, the network device 110 may determine that the measurement gap needs to be configured. In response to the first and second frequency regions being in the operating frequency range of the terminal device, the network device 110 may determine whether the neighbor cell is synchronized with the serving cell. If so, the network device 110 may determine that the measurement gap does not need to be configured. Otherwise, if the neighbor cell is asynchronous with the serving cell, the network device 110 may further determine whether the first frequency region is different from the second frequency region. If the first frequency region is different from the second frequency region, the network device 110 may determine that the measurement gap needs to be configured. Otherwise, if they are the same, the network device 110 may determine that the measurement gap does not need to be configured.

In some alternative embodiments, frequency coordination of synchronization signals may be performed between different cells, so as to reduce the necessity of the measurement gap. More specifically, if the second frequency region is different from the first frequency region, for example, the inter-frequency cases as shown in FIGS. 2D and 2E, the network device 110 may request the neighbor network device 130 to align the second frequency region to the first frequency region. The coordination may be implemented in a variety of ways.

In some embodiments, the network device 110 may transmit a request for aligning the second frequency region to the first frequency region to the neighbor network device 130 managing the neighbor cell 131. Upon receipt of the request, the neighbor network device 130 may determine whether the second synchronization signal can be aligned to the first synchronization signal based on, for example, its capability, its capacity, the number of terminal device in the neighbor cell 131, system requirements, and/or other possible factors. In an embodiment, if there is no UE in the neighbor cell 131, the neighbor network device 130 may determine that its synchronization signal can be moved. Then, the neighbor network device 130 may generate a response indicating whether the second synchronization signal is aligned to the first synchronization signal and transmit the response to the serving network device. In response to receiving, from the neighbor network device 130, a response indicating that the second frequency region is aligned to the first frequency region, the network device 110 may determine that the measurement gap does not need to be configured. In this way, the overhead of measurement gap can be reduced.

On the other hand, if the response indicating the second frequency region is not aligned to the first frequency region, the network device 110 may determine that the measurement gap still needs to be configured.

FIGS. 4A-4F show diagrams of operating frequency ranges of a UE, a serving cell and a neighbor cell and frequency regions for transmitting synchronization signals in accordance with embodiments of the present disclosure, respectively. In the examples shown with respect to FIGS. 4A-4F, the measurement gap does not need to be configured since the first and second synchronization signals are transmitted on the same frequency regions. In all of these examples, the first and second frequency regions are both in the operating frequency range of the terminal device.

Figures 4A, 4B, 4C:
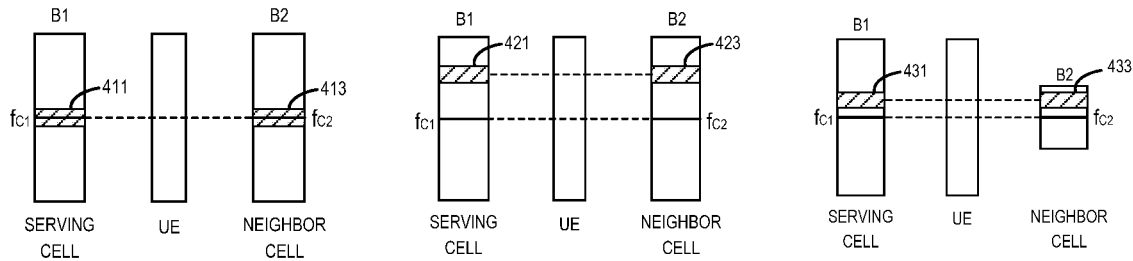
FIGS. 4A-4F show diagrams of operating frequency ranges of a UE, a serving cell and a neighbor cell and frequency regions for transmitting synchronization signals in accordance with embodiments of the present disclosure, respectively.

FIG. 4A shows a scenario where the serving cell and the neighbor cell have the same carrier frequencies, $fc1=fc2$, and have the same operating frequency ranges, $B1=B2$, and the first frequency region 411 is identical to the second frequency region 413. In this case, the center of the first frequency region 411 is the same as the carrier frequency $fc1$, and the center of the second frequency region 413 is the same as the carrier frequency $fc2$.

FIG. 4B shows a scenario where $fc1=fc2$, $B1=B2$, and the first frequency region 421 is identical to the second frequency region 423. In this case, the center of the first frequency region 421 is above the carrier frequency $fc1$, and the center of the second frequency region 423 is above the carrier frequency $fc2$.

FIG. 4C shows a scenario where $fc1=fc2$, $B1>B2$, and the first frequency region 431 is identical to the second frequency region 433. In this case, the center of the first frequency region 431 is above the carrier frequency $fc1$, and the center of the second frequency region 433 is above the carrier frequency $fc2$.

Figures 4D, 4E, 4F:
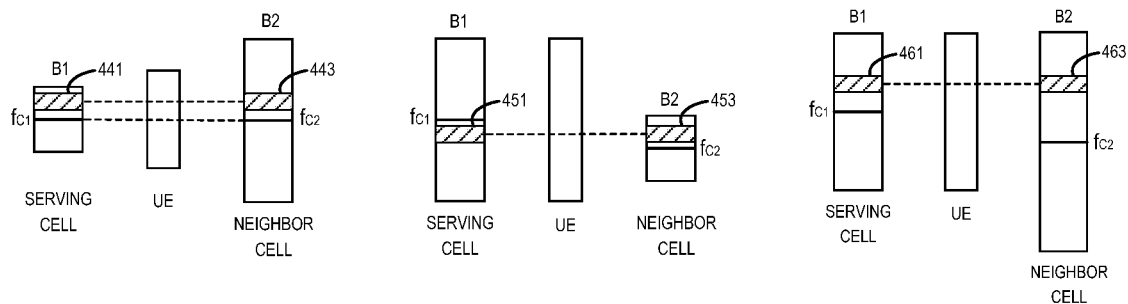

FIG. 4D shows a scenario where $fc1=fc2$, $B1<B2$, and the first frequency region 441 is identical to the second frequency region 443. In this case, the center of the first frequency region 441 is above the carrier frequency $fc1$, and the center of the second frequency region 443 is above the carrier frequency $fc2$.

FIG. 4E shows a scenario where $fc1 \neq fc2$, $B1>B2$, and the first frequency region 451 is identical to the second frequency region 453. In this case, the center of the first frequency region 451 is below the carrier frequency $fc1$, and the center of the second frequency region 453 is above the carrier frequency $fc2$.

FIG. 4F shows a scenario where $fc1 \neq fc2$, $B1<B2$, and the first frequency region 461 is identical to the second frequency region 463. In this case, the center of the first frequency region 461 is above the carrier frequency $fc1$, and the center of the second frequency region 463 is above the carrier frequency $fc2$.

FIGS. 5A-5E show diagrams of operating frequency ranges of a UE, a serving cell and a neighbor cell and frequency regions for transmitting synchronization signals in accordance with further embodiments of the present disclosure, respectively. The examples shown with respect to FIGS. 5A-5E illustrate some scenarios where the measurement gap may or may not be configured.

FIG. 5A shows a scenario where the serving cell and the neighbor cell have the same carrier frequencies, $fc1=fc2$, and have the same operating frequency ranges, $B1=B2$, but the first frequency region 511 is different from the second frequency region 513. In an embodiment, the measurement gap needs to be configured due to different frequency regions 511 and 513.

Alternatively, in another embodiment, since the first and second frequency regions 511 and 513 are both in the operating frequency range 512 of the terminal device 120, the network device 110 may determine that the measurement gap does not need to be configured.

In a further alternative embodiment, since the first and second frequency regions 511 and 513 are both in the operating frequency range 512, the network device 110 may further determine whether the neighbor cell is synchronized with the serving cell. If so, the network device 110 may determine that the measurement gap does not need to be configured. Otherwise, if the neighbor cell is asynchronous with the serving cell, the network device 110 may further determine whether the first frequency region is different from the second frequency region. Since the first and second frequency regions 511 and 513 are different, the network device 110 determines that the measurement gap needs to be configured.

FIG. 5B shows a scenario where fc1≠fc2, B1>B2, the first and second frequency regions 521 and 523 are different but both in the operating frequency range 522 of the terminal device 120. In an embodiment, the measurement gap needs to be configured due to different frequency regions 521 and 523.

Alternatively, in another embodiment, since the first and second frequency regions 521 and 523 are both in the operating frequency range 522, the network device 110 may determine that the measurement gap does not need to be configured.

In a further alternative embodiment, since the first and second frequency regions 521 and 523 are both in the operating frequency range 522, the network device 110 may further determine whether the neighbor cell is synchronized with the serving cell. If so, the network device 110 may determine that the measurement gap does not need to be configured.

Otherwise, if the neighbor cell is asynchronous with the serving cell, the network device 110 may determine that the measurement gap needs to be configured since the first and second frequency regions 521 and 523 are different.

FIG. 5C shows a scenario where fc1≠fc2, B1<B2, the first and second frequency regions 531 and 533 are different but both in the operating frequency range 532 of the terminal device 120. In an embodiment, the measurement gap needs to be configured due to different frequency regions 531 and 533.

Alternatively, in another embodiment, since the first and second frequency regions 531 and 533 are both in the operating frequency range 532, the network device 110 may determine that the measurement gap does not need to be configured.

In a further alternative embodiment, since the first and second frequency regions 531 and 533 are both in the operating frequency range 532, the network device 110 may further determine whether the neighbor cell is synchronized with the serving cell. If so, the network device 110 may determine that the measurement gap does not need to be configured. Otherwise, if the neighbor cell is asynchronous with the serving cell, the network device 110 may determine that the measurement gap needs to be configured since the first and second frequency regions 531 and 533 are different.

FIG. 5D shows a scenario where fc1≠fc2, B1=B2, the first and second frequency regions 541 and 543 are different and the second frequency region 543 is out of the operating frequency range 542 of the terminal device 120. In an embodiment, the measurement gap needs to be configured due to different frequency regions 541 and 543.

Alternatively, in another embodiment, since the second frequency region 543 is out of the operating frequency range 542, the network device 110 may determine that the measurement gap needs to be configured.

FIG. 5E shows a scenario where fc1=fc2, B1=B2, the first and second frequency regions 541 and 543 are identical, but the first and second frequency region 551 and 553 are both out of the operating frequency range 552 of the terminal device 120. In this case, the network device 110 may determine that the measurement gap needs to be configured.

Still referring to FIG. 3, at 330, the network device 110 transmits the configuration for the measurement gap to a terminal device 120 in the serving cell 111. In some embodiments, the configuration for the measurement gap may be included in a message or a signaling, such as a RRC signaling, a MAC signaling, and the like, and transmitted to the terminal device 120 via the message or the signaling. It is to be understood that these examples are discussed for illustration, rather than suggesting any limitation. Those skilled in the art would appreciate that the configuration for the measurement gap may be transmitted in any other suitable ways.

Additionally, in some embodiments, the network device 110 may further transmit some additional information to the terminal device 120 to facilitate measurement of the synchronization signal. In an embodiment, the network device 110 may transmit, to the terminal device 120, information about one or more of the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, whether the neighbor cell is synchronized with the serving cell, and/or the like. The offset between the first frequency region and the second frequency region may indicate the relative frequency locations of the first and second frequency regions, for example, the difference between the centers of the first and second frequency regions. The offset between the first/second frequency region and the carrier frequency of the serving/neighbor cell may indicate the relative frequency locations of the first/second frequency region and the carrier frequency, for example, the difference between the center, the maximum frequency, or the minimum frequency of the first/second frequency region and the carrier frequency.

Compared with the conventional solutions, by configuring the measurement gap based on frequency regions for transmitting synchronization signals from different cells, instead of the carrier frequencies of the cells, the network device can correctly configure the measurement gap and the UE can accurately measure the synchronization signals accordingly. In this way, spectrum efficiency can be increased and performance of the network can be improved.

FIG. 6 shows a flowchart of a method 600 of measuring a synchronization signal according to configuration of a measurement gap in accordance with an embodiment of the present disclosure. It would be appreciated by those skilled in the art that the method 600 may be implemented by a terminal device, such as the terminal device 120 or other suitable devices.

The method 600 is entered at block 610, where the terminal device 120 receives a configuration for a measurement gap from a network device managing a serving cell. The configuration for the measurement gap indicates whether the measurement gap is configured for the terminal device to measure the second synchronization signal. The configuration may be determined based on a first frequency region and a second frequency region.

The first frequency region is used for transmitting a first synchronization signal from the serving cell, and may be located at any position of the carrier bandwidth of the serving cell, for example, the first frequency region 411, 421, 431, 441, 451 and 461 shown in FIG. 4 and the first frequency region 511, 521, 531, 541, and 551 shown in FIG. 5. The second frequency region is used for transmitting a second synchronization signal from a neighbor cell of the serving cell, and may be located at any position of the carrier bandwidth of the neighbor cell, for example, the first frequency region 413, 423, 433, 443, 453 and 463 shown in FIG. 4 and the first frequency region 513, 523, 533, 543, and 553 shown in FIG. 5.

At block 620, the terminal device 120 measures the second synchronization signal based on the configuration for the measurement gap. According to embodiments of the present disclosure, the measurement may be implemented in a variety of ways. In some embodiments, if the configuration indicating that the measurement gap is configured, terminal device 120 may measure the second synchronization signal on the second frequency region in the measurement gap. Otherwise, the terminal device 120 may measure the second synchronization signal on the second frequency region together with measuring first synchronization signal on the first frequency region.

Additionally, in some embodiments, the terminal device 120 may further receive some additional information from the network device 110 to facilitate the measurement of the synchronization signal. In an embodiment, the terminal device 120 may receive information about one or more of the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, whether the neighbor cell is synchronized with the serving cell, and/or the like.

In some embodiments, if the configuration indicating that the measurement gap is configured, the terminal device 120 may determine whether the measurement gap is to be used when measuring the second synchronization signal based on the information about whether the neighbor cell is synchronized with the serving cell. For instance, if the neighbor cell is synchronized with the serving cell, the terminal device 120 may determine that the measurement gap does not need to be configured, and if the neighbor cell is asynchronous with the serving cell, the terminal device 120 may determine that the measurement gap needs to be configured.

According to embodiments of the present disclosure, optionally, the terminal device 120 may transmit information of capability of the terminal device to the network device 110, to facilitate the network device 110 to configure the measurement gap. The information of the capability may indicate whether the terminal device needs a measurement gap, the operating frequency range of the terminal device, a condition of a battery of the terminal device, power consumption, connection status, workload, and/or the like. Relevant details of the capability have been discussed at 320 of method 300, thus are omitted here for purpose of simplification.

Figure 7:
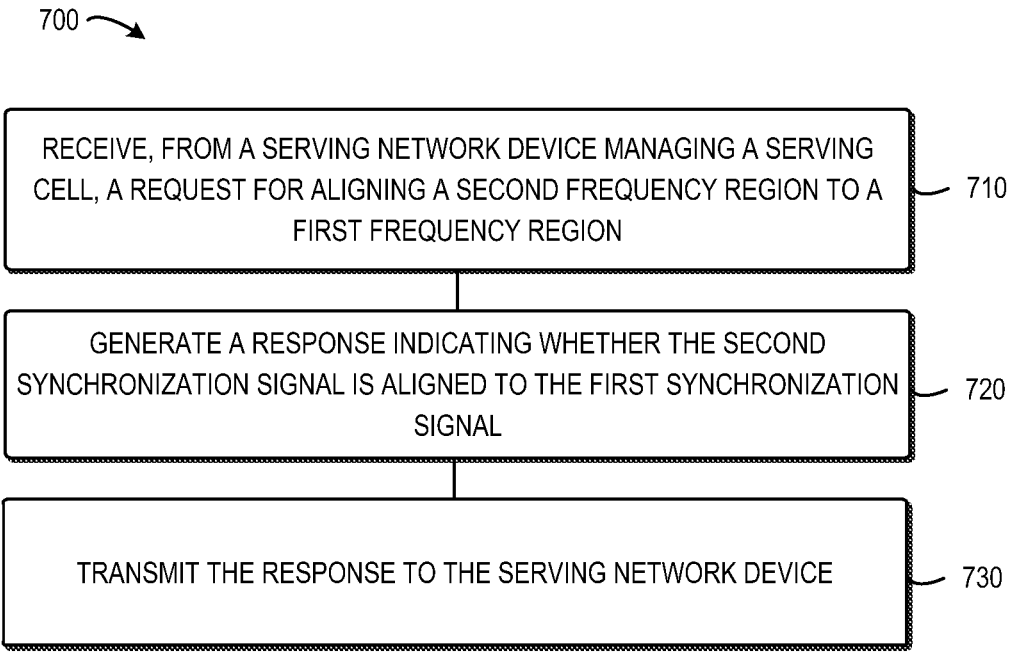
FIG. 7 shows a flowchart of a method 700 of adjusting a frequency region for transmitting a synchronization signal in accordance with an embodiment of the present disclosure.

FIG. 7 shows a flowchart of a method 700 of adjusting a frequency region for transmitting a synchronization signal in accordance with embodiments of the present disclosure. In these embodiments, frequency coordination of synchronization signals is performed between different cells, so as to reduce the necessity of the measurement gap. It would be appreciated by those skilled in the art that the method 700 may be implemented by a network device, such as the neighbor network device 130 or other suitable devices.

The method 700 is entered at block 710, where the network device 130 receives, from a serving network device 110 managing a serving cell 111, a request for aligning a second frequency region to a first frequency region. The first frequency region is used for transmitting a first synchronization signal from the serving cell 111, and the second frequency region is used for transmitting a second synchronization signal from a neighbor cell 131 of the serving cell 111. The neighbor cell 131 is managed by the network device 130. The request may be triggered in several cases, for example, when the second frequency region is different from the first frequency region, for example, the inter-frequency cases as shown in FIGS. 2D and 2E.

At block 720, the network device 130 generates a response indicating whether the second synchronization signal is aligned to the first synchronization signal. More specifically, upon receipt of the request, the neighbor network device 130 may determine whether the second synchronization signal can be aligned to the first synchronization signal based on, for example, its capability, its capacity, the number of terminal device in the neighbor cell 131, system requirements, and/or other possible factors. For example, if there is no UE in the neighbor cell 131, the network device 130 may determine that its synchronization signal can be moved. Then, the neighbor network device 130 may generate a response based on the determination.

The response may be implemented in several ways, for example, as a new message/signaling, as a portion of a conventional message/signaling, or the like. It is to be understood by those skilled in the art that the above example is just discussed for illustration, rather than limitation. Those skilled in the art would appreciate that the response can be implemented in other suitable ways.

At block 730, the network device 130 transmits the response to the serving network device. In some embodiments, the response may be transmitted in a signaling via an X2 interface. It is to be understood by those skilled in the art that the X2 interface is just discussed for illustration, rather than limitation. Those skilled in the art would appreciate that the response can be transmitted through other suitable interface.

In the conventional LTE scheme, every 40/80 ms, there is a measurement GAP of 6*ms*. Thus, the measurement gap is not a big issue, but it becomes more severe in NR. The reason is that in NR the periodicity of IDLE RS is quite long (for example, 20 ms) compared to LTE. The measurement gap may need to be prolonged to meet this requirement, which means the overhead of measurement GAP is increased. Thus, it is important to reduce the measurement gap in NR if possible. According to embodiments of the present disclosure, it is possible to reduce the measurement gap with frequency coordination of synchronization signals.

Now more details for the frequency coordination are discussed with reference to FIG. 8, which shows a diagram 800 of synchronization signal coordination in accordance with embodiments of the present disclosure. In these embodiments, the serving network device 110, neighbor network device 130 and the terminal device 120 shown in FIG. 1 are discussed for example.

Figure 8:
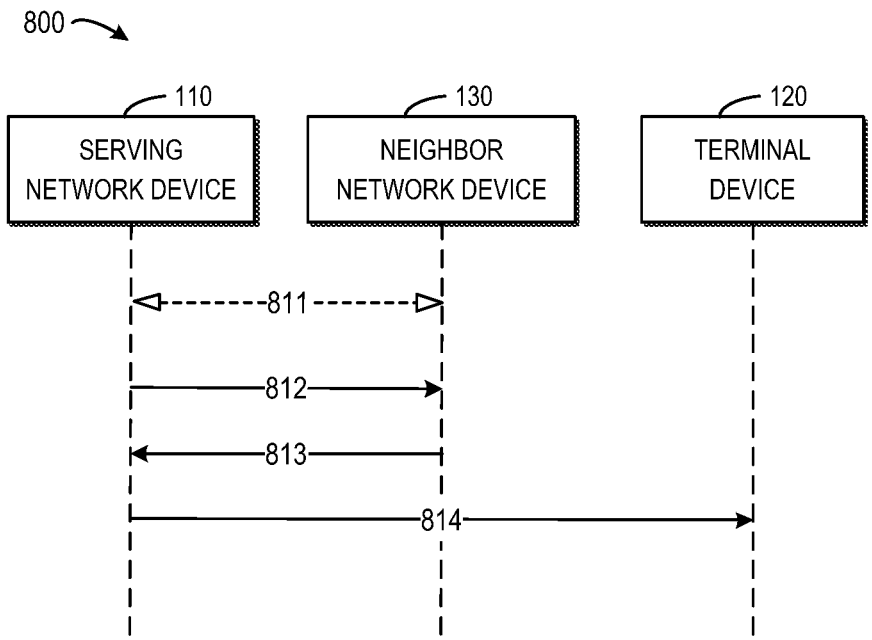
FIG. 8 shows a diagram 800 of synchronization signal coordination in accordance with an embodiment of the present disclosure.

As shown in FIG. 8, the serving network device 110 and the neighbor network device 130 exchange 811 information with each other about synchronization signals (for example, IDLE RS positions) at the first and second cells. When the terminal device 120, for example a UE, attaches to the serving cell, the serving network device 110 may check with the neighbor network device 130 whether the IDLE RS position of the neighbor cell is different from that of the serving cell. If so, the serving network device 110 may send 812 a request for aligning the second frequency region for transmitting its IDLE RS to the first frequency region for transmitting the IDLE RS of the serving cell. The neighbor network device 130 may check whether it is possible to align the second frequency region to the first frequency region. If it is possible, e.g. there are no UE in the neighbor cell yet, the neighbor network device 130 can move its IDLE RS position to align with serving cell. Then, the neighbor network device 130 may transmit 813 to the serving network device 110 a response to notify the alignment. Upon receipt of the response, the serving network device 110 may determine that the measurement gap is not needed and configure 814 the terminal device to measure the synchronization signal without the measurement gap.

In view of the above frequency coordination, even in some inter-frequency measurement scenarios, the measurement gap can be avoided. In this way, the terminal device can be scheduled without the measurement gap. As such, it is possible to reduce a negative effect to throughput of the terminal device caused by the measurement gap.

Figure 9:
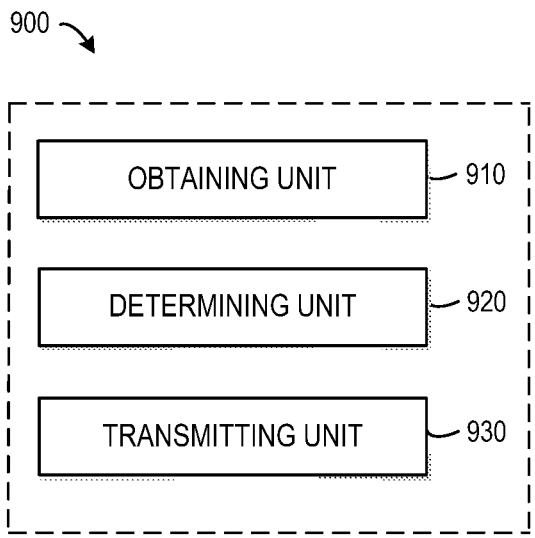
FIG. 9 shows a block diagram of an apparatus 900 implemented at a network device in accordance with an embodiment of the present disclosure.

FIG. 9 shows a block diagram of an apparatus 900 implemented at a network device in accordance with an embodiment of the present disclosure. It would be appreciated that the apparatus 900 may be implemented at a network device, for example, the network device 110 or any other suitable device.

As shown, the apparatus 900 includes an obtaining unit 910, a determining unit 920 and a transmitting unit 930. The obtaining unit 910 is configured to obtain information about a first frequency region and a second frequency region. The first frequency region is used for transmitting a first synchronization signal from a serving cell managed by the network device, and the second frequency region is used for transmitting a second synchronization signal from a neighbor cell of the serving cell. The determining unit 920 is configured to determine a configuration for a measurement gap based on the first frequency region and the second frequency region. The configuration indicates whether the measurement gap is configured for a terminal device in the serving cell to measure the second synchronization signal. The transmitting unit 930 is configured to transmit the configuration for the measurement gap to the terminal device.

In an embodiment, the determining unit 920 may be further configured to: determine a relationship between the first frequency region and the second frequency region; and determine whether the measurement gap needs to be configured based on at least one of the relationship and information of capability of the terminal device.

In an embodiment, the determining unit 920 may be further configured to: in response to the second frequency region being different from the first frequency region, determine that the measurement gap needs to be configured; and in response to the second frequency region being identical to the first frequency region, determine whether the first or second frequency region is in an operating frequency range of the terminal device, and in response to determining that the first or second frequency region is in the operating frequency range of the terminal device, determine that the measurement gap does not need to be configured.

In an embodiment, the determining unit 920 may be further configured to: in response to the first or second frequency region being out of an operating frequency range of the terminal device, determine that the measurement gap needs to be configured; and in response to the first and second frequency regions being in the operating frequency range of the terminal device, determine that the measurement gap does not need to be configured.

In an embodiment, the determining unit 920 may be further configured to: in response to the first or second frequency region being out of an operating frequency range of the terminal device, determine that the measurement gap needs to be configured; and in response to the first and second frequency regions being in the operating frequency range of the terminal device, determine whether the neighbor cell is synchronized with the serving cell, in response to determining that the neighbor cell is synchronized with the serving cell, determine that the measurement gap does not need to be configured, and determine whether the first frequency region is different from the second frequency region, and in response to the first frequency region is different from the second frequency region, determine that the measurement gap needs to be configured.

In an embodiment, the determining unit 920 may be further configured to: in response to the second frequency region being different from the first frequency region, transmit, to a neighbor network device managing the neighbor cell, a request for aligning the second frequency region to the first frequency region, and in response to receiving, from the neighbor network device, a response indicating that the second frequency region is aligned to the first frequency region, determine that the measurement gap does not need to be configured.

In an embodiment, the transmitting unit 930 may be further configured to transmit, to the terminal device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

Figure 10:
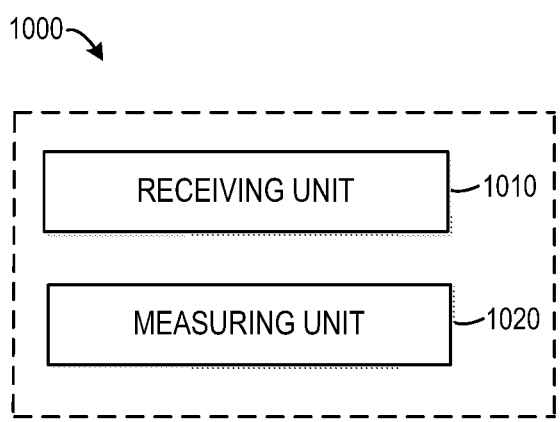
FIG. 10 shows a block diagram of an apparatus 1000 implemented at a terminal device in accordance with an embodiment of the present disclosure.

FIG. 10 shows a block diagram of an apparatus 1000 implemented at a terminal device in accordance with an embodiment of the present disclosure. It would be appreciated that the apparatus 1000 may be implemented at a terminal device, for example, the terminal device 120 or any other suitable device.

As shown, the apparatus 1000 includes a receiving unit 1010 and a measuring unit 1020. The receiving unit 1010 is configured to receive a configuration for a measurement gap from a network device managing a serving cell, the configuration for the measurement gap being determined based on a first frequency region and a second frequency region and indicating whether the measurement gap is configured for the terminal device to measure the second synchronization signal, the first frequency region being used for transmitting a first synchronization signal from the serving cell, and the second frequency region being used for transmitting a second synchronization signal from a neighbor cell of the serving cell. The measuring unit 1020 is configured to measure the second synchronization signal based on the configuration for the measurement gap.

In an embodiment, the measuring unit 1020 may be further configured to: in response to the configuration indicating that the measurement gap is configured, measure the second synchronization signal on the second frequency region in the measurement gap; and in response to the configuration indicating that the measurement gap is not configured, measure the second synchronization signal on the second frequency region together with measuring first synchronization signal on the first frequency region.

In an embodiment, the receiving unit 1010 may be further configured to receive, from the network device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

In an embodiment, the measuring unit 1020 may be further configured to: in response to the configuration indicating that the measurement gap is configured, determine whether the measurement gap is to be used when measuring the second synchronization signal based on the information about whether the neighbor cell is synchronized with the serving cell.

In an embodiment, the apparatus 1000 may further comprise a transmitting unit configured to transmit information of capability of the terminal device to the network device.

Figure 11:
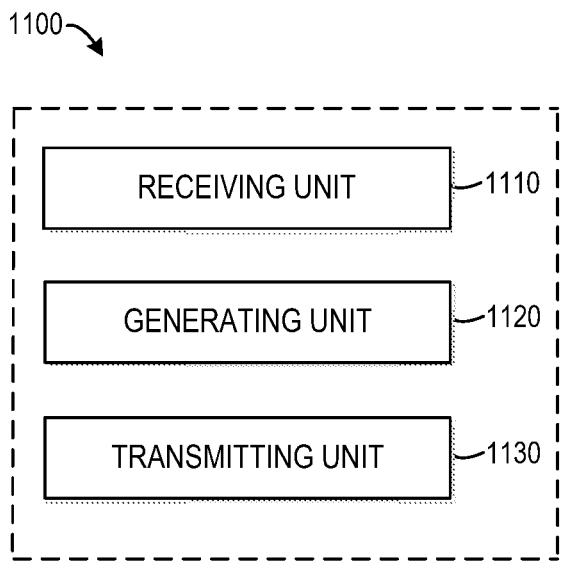
FIG. 11 shows a block diagram of an apparatus 1100 implemented at a network device in accordance with an embodiment of the present disclosure.

FIG. 11 shows a block diagram of an apparatus 1100 implemented at a network device in accordance with an embodiment of the present disclosure. It would be appreciated that the apparatus 1100 may be implemented at a network device, for example, the network device 130 or any other suitable device.

As shown, the apparatus 1100 includes a receiving unit 1110, a generating unit 1120, and a transmitting unit 1130. The receiving unit is configured to receive, from a serving network device managing a serving cell, a request for aligning a second frequency region to a first frequency region, the first frequency region being used for transmitting a first synchronization signal from the serving cell, the second frequency region being used for transmitting a second synchronization signal from a neighbor cell of the serving cell, and the neighbor cell being managed by the network device. The generating unit 1120 is configured to generate a response indicating whether the second synchronization signal is aligned to the first synchronization signal. The transmitting unit 1130 is configured to transmit the response to the serving network device.

It should be appreciated that components included in the apparatuses 900, 1000 and 1100 correspond to the operations of the methods 300, 600 and 700, respectively. Therefore, all operations and features described above with reference to FIGS. 3, 6 and 7 are likewise applicable to the components included in the apparatuses 900, 1000 and 1100 and have similar effects, respectively. For the purpose of simplification, the details will be omitted.

The components included in the apparatus 900, 1000 or 1100 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatus 900, 1000 or 1100 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for obtaining information about a first frequency region and a second frequency region, the first frequency region being used for transmitting a first synchronization signal from a serving cell managed by the network device, and the second frequency region being used for transmitting a second synchronization signal from a neighbor cell of the serving cell; means for determining a configuration for a measurement gap based on the first frequency region and the second frequency region, the configuration indicating whether the measurement gap is configured for a terminal device in the serving cell to measure the second synchronization signal; and means for transmitting the configuration for the measurement gap to the terminal device.

In an embodiment, the means for determining the configuration for a measurement gap comprises: means for determining a relationship between the first frequency region and the second frequency region; and means for determining whether the measurement gap needs to be configured based on at least one of the relationship and information of capability of the terminal device.

In an embodiment, the means for determining whether the measurement gap needs to be configured comprises: means for, in response to the second frequency region being different from the first frequency region, determining that the measurement gap needs to be configured; and means for, in response to the second frequency region being identical to the first frequency region, determining whether the first or second frequency region is in an operating frequency range of the terminal device, and in response to determining that the first or second frequency region is in the operating frequency range of the terminal device, determining that the measurement gap does not need to be configured.

In an embodiment, the means for determining whether the measurement gap needs to be configured comprises: means for, in response to the first or second frequency region being out of an operating frequency range of the terminal device, determining that the measurement gap needs to be configured; and means for, in response to the first and second frequency regions being in the operating frequency range of the terminal device, determining that the measurement gap does not need to be configured.

In an embodiment, the means for determining whether the measurement gap needs to be configured comprises: means for, in response to the first or second frequency region being out of an operating frequency range of the terminal device, determining that the measurement gap needs to be configured; and means for, in response to the first and second frequency regions being in the operating frequency range of the terminal device, determining whether the neighbor cell is synchronized with the serving cell, in response to determining that the neighbor cell is synchronized with the serving cell, determining that the measurement gap does not need to be configured, and in response to determining that the neighbor cell being asynchronous with the serving cell, determining whether the first frequency region is different from the second frequency region, and in response to the first frequency region is different from the second frequency region, determining that the measurement gap needs to be configured.

In an embodiment, the means for determining whether the measurement gap needs to be configured comprises: means for, in response to the second frequency region being different from the first frequency region, transmitting, to a neighbor network device managing the neighbor cell, a request for aligning the second frequency region to the first frequency region, and in response to receiving, from the neighbor network device, a response indicating that the second frequency region is aligned to the first frequency region, determining that the measurement gap does not need to be configured.

In an embodiment, the apparatus further comprises means for transmitting, to the terminal device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

In accordance with embodiments of the present disclosure, there is provided an apparatus implemented at a terminal device. The apparatus includes: means for receiving a configuration for a measurement gap from a network device managing a serving cell, the configuration for the measurement gap being determined based on a first frequency region and a second frequency region and indicating whether the measurement gap is configured for the terminal device to measure the second synchronization signal, the first frequency region being used for transmitting a first synchronization signal from the serving cell, and the second frequency region being used for transmitting a second synchronization signal from a neighbor cell of the serving cell; and means for measuring the second synchronization signal based on the configuration for the measurement gap.

In an embodiment, the means for measuring the second synchronization signal comprises: means for, in response to the configuration indicating that the measurement gap is configured, measuring the second synchronization signal on the second frequency region in the measurement gap; and means for, in response to the configuration indicating that the measurement gap is not configured, measuring the second synchronization signal on the second frequency region together with measuring first synchronization signal on the first frequency region.

In an embodiment, the apparatus further comprises means for receiving, from the network device, information about one or more of: the first frequency region, the second frequency region, a carrier frequency of the serving cell, a carrier frequency of the neighbor cell, an offset between the first frequency region and the second frequency region, an offset between the first frequency region and the carrier frequency of the serving cell, an offset between the second frequency region and the carrier frequency of the neighbor cell, and whether the neighbor cell is synchronized with the serving cell.

In an embodiment, the means for measuring the second synchronization signal comprises: means for, in response to the configuration indicating that the measurement gap is configured, determining whether the measurement gap is to be used when measuring the second synchronization signal based on the information about whether the neighbor cell is synchronized with the serving cell.

In an embodiment, the apparatus may further comprise means for transmitting information of capability of the terminal device to the network device.

In accordance with embodiments of the present disclosure, there is provided an apparatus implemented at a network device. The apparatus includes: means for receiving, from a serving network device managing a serving cell, a request for aligning a second frequency region to a first frequency region, the first frequency region being used for transmitting a first synchronization signal from the serving cell, the second frequency region being used for transmitting a second synchronization signal from a neighbor cell of the serving cell, and the neighbor cell being managed by the network device; means for generating a response indicating whether the second synchronization signal is aligned to the first synchronization signal; and means for transmitting the response to the serving network device.

Figure 12:
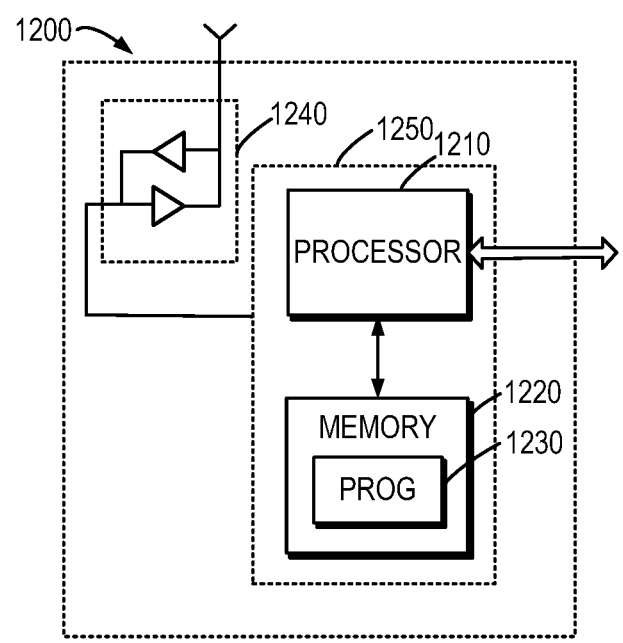
FIG. 12 shows a simplified block diagram 1200 of a device that is suitable for use in implementing embodiments of the present disclosure.

FIG. 12 is a simplified block diagram of a device 1200 that is suitable for implementing embodiments of the present disclosure. As shown, the device 1200 includes one or more processors 1210, one or more memories 1220 coupled to the processor(s) 1210, one or more transmitters and/or receivers (TX/RX) 1240 coupled to the processor 1210.

The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 1220 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements.

The program 1230 is assumed to include program instructions that, when executed by the associated processor 1210, enable the device 1200 to operate in accordance with the embodiments of the present disclosure, as discussed herein with reference to FIGS. 3 to 7. That is, embodiments of the present disclosure can be implemented by computer software executable by the processor 1210 of the device 1200, or by hardware, or by a combination of software and hardware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method at a network device, comprising:
    obtaining information about a first frequency region and a second frequency region, the first frequency region being used for transmitting a first synchronization signal from a serving cell managed by the network device, and the second frequency region being used for transmitting a second synchronization signal from a neighbor cell of the serving cell;
    determining a configuration for a measurement gap based on the first frequency region and the second frequency region, the configuration indicating presence or absence of the measurement gap for a terminal device in the serving cell to measure the second synchronization signal; and
    transmitting the configuration for the measurement gap to the terminal device independent of the presence or absence of the measurement gap.

2. The method according to claim 1, wherein determining the configuration for a measurement gap comprises:
    determining a relationship between the first frequency region and the second frequency region; and
    determining whether the measurement gap needs to be configured based on at least one of the relationship and information of capability of the terminal device.

3. The method according to claim 2, wherein determining whether the measurement gap needs to be configured comprises:
    in response to the second frequency region being different from the first frequency region, determining that the measurement gap needs to be configured; and
    in response to the second frequency region being identical to the first frequency region,
        determining whether the first or second frequency region is in an operating frequency range of the terminal device, and
        in response to determining that the first or second frequency region is in the operating frequency range of the terminal device, determining that the measurement gap does not need to be configured.

4. The method according to claim 2, wherein determining whether the measurement gap needs to be configured comprises:
    in response to the first or second frequency region being out of an operating frequency range of the terminal device, determining that the measurement gap needs to be configured; and in response to the first and second frequency regions being in the operating frequency range of the terminal device, determining that the measurement gap does not need to be configured.

5. The method according to claim 2, wherein determining whether the measurement gap needs to be configured comprises:
in response to the first or second frequency region being out of an operating frequency range of the terminal device, determining that the measurement gap needs to be configured; and
in response to the first and second frequency regions being in the operating frequency range of the terminal device,
determining whether the neighbor cell is synchronized with the serving cell,
in response to determining that the neighbor cell is synchronized with the serving cell, determining that the measurement gap does not need to be configured,
in response to determining that the neighbor cell being asynchronous with the serving cell, determining whether the first frequency region is different from the second frequency region, and
in response to the first frequency region is different from the second frequency region, determining that the measurement gap needs to be configured.

6. The method according to claim 2, wherein determining whether the measurement gap needs to be configured comprises:
in response to the second frequency region being different from the first frequency region,
transmitting, to a neighbor network device managing the neighbor cell, a request for aligning the second frequency region to the first frequency region, and
in response to receiving, from the neighbor network device, a response indicating that the second frequency region is aligned to the first frequency region, determining that the measurement gap does not need to be configured.

7. The method according to claim 1, further comprising:
transmitting, to the terminal device, information about one or more of:
the first frequency region,
the second frequency region,
a carrier frequency of the serving cell,
a carrier frequency of the neighbor cell,
an offset between the first frequency region and the second frequency region,
an offset between the first frequency region and the carrier frequency of the serving cell,
an offset between the second frequency region and the carrier frequency of the neighbor cell, and
whether the neighbor cell is synchronized with the serving cell.

8. A method at a terminal device, comprising:
receiving a configuration for a measurement gap from a network device managing a serving cell, the configuration for the measurement gap being determined based on a first frequency region and a second frequency region and indicating presence or absence of the measurement gap for the terminal device to measure the second synchronization signal, the first frequency region being used for transmitting a first synchronization signal from the serving cell, and the second frequency region being used for transmitting a second synchronization signal from a neighbor cell of the serving cell; and
measuring the second synchronization signal based on the configuration for the measurement gap independent of the presence or absence of the measurement gap.

9. The method according to claim 8, wherein measuring the second synchronization signal comprises:
in response to the configuration indicating that the measurement gap is configured, measuring the second synchronization signal on the second frequency region in the measurement gap; and
in response to the configuration indicating that the measurement gap is not configured, measuring the second synchronization signal on the second frequency region together with measuring first synchronization signal on the first frequency region.

10. The method according to claim 8, further comprising:
receiving, from the network device, information about one or more of:
the first frequency region,
the second frequency region,
a carrier frequency of the serving cell,
a carrier frequency of the neighbor cell,
an offset between the first frequency region and the second frequency region,
an offset between the first frequency region and the carrier frequency of the serving cell,
an offset between the second frequency region and the carrier frequency of the neighbor cell, and
whether the neighbor cell is synchronized with the serving cell.

11. The method according to claim 10, wherein measuring the second synchronization signal comprises:
in response to the configuration indicating that the measurement gap is configured, determining whether the measurement gap is to be used when measuring the second synchronization signal based on the information about whether the neighbor cell is synchronized with the serving cell.

12. The method according to claim 8, further comprising:
transmitting information of capability of the terminal device to the network device.

13. A method at a network device, comprising:
receiving, from a serving network device managing a serving cell, a request for aligning a second frequency region to a first frequency region, the first frequency region being used for transmitting a first synchronization signal from the serving cell, the second frequency region being used for transmitting a second synchronization signal from a neighbor cell of the serving cell, and the neighbor cell being managed by the network device;
generating a response indicating whether the second synchronization signal is aligned to the first synchronization signal such that the serving network device can determine a configuration for a measurement gap based on the first frequency region and the second frequency region, the configuration indicating presence or absence of the measurement gap for a terminal device in the serving cell to measure the second synchronization signal; and
transmitting the response to the serving network device.

14. A terminal device, comprising:
a processor and a memory, the memory containing program including instructions executable by the processor, the processor being configured to cause the terminal device to:
receive a configuration for a measurement gap from a network device managing a serving cell, the configuration for the measurement gap being determined based on a first frequency region and a second frequency region and indicating presence or absence of the measurement gap for the terminal device to measure the second synchronization signal, the first frequency region being used for transmitting a first synchronization signal from the serving cell, and the second frequency region being used for transmitting a second synchronization signal from a neighbor cell of the serving cell; and measure the second synchronization signal based on the configuration for the measurement gap independent of the presence or absence of the measurement gap.

* * * * *